Dec. 22, 1942.  W. KAEFER  2,305,712
METHOD OF MAKING PASTRY
Filed Aug. 30, 1940

Inventor
Waldemar Kaefer
By Williamson & Williamson
Attorneys

Patented Dec. 22, 1942

2,305,712

UNITED STATES PATENT OFFICE 2,305,712

METHOD OF MAKING PASTRY

Waldemar Kaefer, Minneapolis, Minn.

Application August 30, 1940, Serial No. 354,858

3 Claims. (Cl. 99—92)

This invention relates to the making of piecrust and other pastries, and relates also to a prepared pastry dough of construction, form and ingredients to assure delectable, flaky crusts and pastries when baked.

Many housewives and cooks have difficulty in uniformly making good pastry and piecrust. Their crusts and pastries will come out of the baking often tough and not of light, flaky, delectable form, which is desired.

It is an object of my invention to provide a prepared dough product which will uniformly result in the production of delicious, light and unusually flaky pastries.

It is a further object to supply the need of housewives and cooks with a uniform, high-grade prepared dough in package form and prepared to be preserved perfectly for relatively long periods of time when maintained at a cool temperature, without losing any of its excellent baking qualities.

A further object is the provision of a simple but highly efficient method for making piecrust and other light pastry products which will assure delicacy, lightness and flakiness of the products.

These and other objects and advantages of the invention will be more fully set forth in the following description made in connection with the accompanying drawing, in which like reference characters refer to the same parts throughout the several views, and in which.

Figures 1, 2, 3:
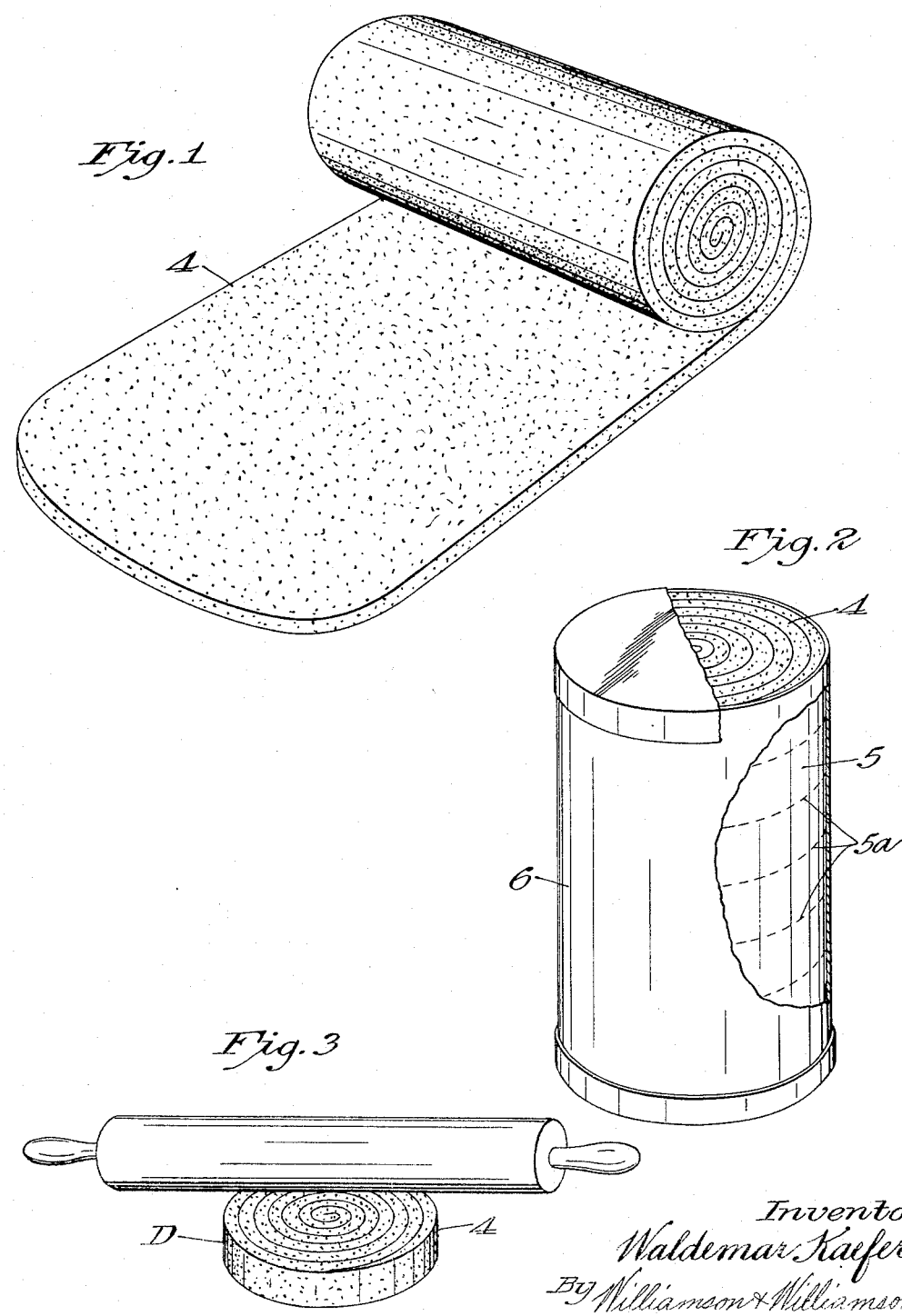
Fig. 1 is a perspective view illustrating the step of rolling up an elongated, rectangular slab of relatively uncompacted dough.
Fig. 2 is a perspective view with a portion of the container broken away and showing my prepared pastry dough packaged.
Fig. 3 is a perspective view illustrating the step in my method of rolling out a disc of the congealed dough to form a piecrust or other pastry article.

In preparing my pastry dough, I preferably follow the highest proven recipes, using the usual pastry flour, salt, shortening and water in the highest approved proportions and manner. The flour and salt are first mixed together, as is the usual practice, and then the shortening and water are carefully worked into the flour in the usual way, care being taken, however, to work the dough no more than necessary to get the proper distribution of the shortening and water therein. The dough is worked, but is preferably not compacted to any considerable extent.

The worked dough is next formed into an elongated, preferably rectangular slab 4 of a thickness preferably between one-fourth and three-fourths of an inch. The forming of this slab is preferably done without compacting the dough, leaving the same substantially porous although to assist a very light rolling may be utilized, if desired.

The slab so formed is next rolled up on the board or table in helical form, forming a cylinder with the successive convolutions of the helix adhering. The cylinder so formed is preferably wrapped with a very thin wrapper 5 which may be formed of thin, readily frangible paper or other suitable material. The wrapper 5 is preferably scored, perforated or otherwise graduated on its cylindrical periphery along a number of equally spaced circles 5a spaced apart the proper distance to indicate transverse discs or sections of the helical cylinder which may be cut from the mass, each section of dough being sufficient for the crust of one pie.

The cylindrical mass of dough in the wrapper is then next preferably placed within a suitable cylindrical container 6 and covered with a cap or air-tight cover and the cover sealed with the cylinder. The package with the dough therein is then next frozen or chilled at a temperature below 45 degrees and preferably slightly below freezing.

The packaged dough may then be kept for long periods of time, maintained at below 45 degrees F. and may be transported in trucks having cooling or refrigeration cabinets for sale to the housewives or other customers.

The next step in my method of making the piecrust consists in projecting the chilled dough in helical form from the container, slicing off a desired amount in the form of a disc D, as shown in Fig. 3, and placing this disc on a flat surface and rolling the same out flatwise into a relatively thin sheet for piecrust. The rolling out step causes the adhesions between the successive convolutions of the disc to be dispersed and spread throughout the rolled sheet. The sheet may then be used as a piecrust or cut up into tarts or formed as other pastry products.

The helical rolling up of the uncovered dough slab with the attendant rolling process of the disc or cylindrical mass and the spreading of the adhesions between the convolutions, produces a baked product of extremely light and flaky qualities.

The process and packaged product are very well adapted for successful commercial use, enabling a purchaser to obtain uniformly high-grade pastry dough having the finest baking qualities. The packaged dough may be of a quantity to provide crust for various numbers of pies or other pastry articles and will keep in the ordinary refrigerator for weeks without deterioration or change in the relatively porous condition of the dough and the high baking qualities and results obtained through the convolutions and adhesions in the production of a light, flaky pastry.

It will, of course, be understood that various means and machinery may be utilized for commercially carrying out the steps of my process recited herein, all within the scope of my invention.

What is claimed is:

1. The method of making piecrust and other pastry which consists in, forming a mass of dough into an elongated slab shape, rolling up said slab helically to form a cylindrical body, and rolling at least a transverse portion of said helically formed body disposed on flat end into a thin sheet to cause the lines formed by the successive convolutions of dough to be dispersed through the thin sheet formed.

2. The method of making piecrust and other pastry which consists in, forming a mass of pie dough into an elongated slab shape, rolling up said slab helically to form a cylindrical body, flattening the ends of said body on planes extending normal to the axis thereof, chilling said body, and flattening at least a transverse portion of said body disposed on end into a thin sheet to cause the lines formed by the successive convolutions of dough to be dispersed through the thin sheet formed.

3. The method of making piecrust and other pastry which consists in, forming a mass of pie dough into an elongated slab, rolling up said slab helically to form a cylindrical body, chilling said body, transversely slicing from said chilled body a disc-like section and rolling said section out into a thin sheet to cause the lines formed by the successive convolutions of dough in the disc to be dispersed through the thin sheet formed.

WALDEMAR KAEFER.